US008892632B2

(12) United States Patent
Knight et al.

(10) Patent No.: US 8,892,632 B2
(45) Date of Patent: Nov. 18, 2014

(54) CLIENT-SERVER INTERACTION FREQUENCY CONTROL

(75) Inventors: Mark R. Knight, Bellevue, WA (US); Christopher J. Antos, Bellevue, WA (US); Manasi V. Velhankar, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 518 days.

(21) Appl. No.: 12/793,705

(22) Filed: Jun. 4, 2010

(65) Prior Publication Data

US 2011/0302237 A1 Dec. 8, 2011

(51) Int. Cl.
*G06Q 10/10* (2012.01)
*G06Q 10/06* (2012.01)
*G06F 15/16* (2006.01)
*H04L 12/801* (2013.01)
*H04L 29/06* (2006.01)
*G06F 17/30* (2006.01)

(52) U.S. Cl.
CPC ...... *G06Q 10/101* (2013.01); *G06Q 10/063116* (2013.01); *G06Q 10/103* (2013.01); *H04L 47/10* (2013.01); *H04L 29/06401* (2013.01); *G06F 17/30* (2013.01); *G06F 15/16* (2013.01); *H04L 65/4015* (2013.01); *G06Q 10/06* (2013.01)
USPC .... 709/203; 709/205; 707/617; 707/E17.009; 370/412; 370/468

(58) Field of Classification Search
CPC ... H04L 29/08072; H04L 29/06; H04L 47/10; H04L 29/06095
USPC .................. 709/203, 205; 707/617, E17.009; 370/412, 468
See application file for complete search history.

(56) References Cited

U.S. PATENT DOCUMENTS

| | | | |
|---|---|---|---|
| 5,664,106 A | 9/1997 | Caccavale | |
| 6,330,566 B1 * | 12/2001 | Durham | 1/1 |
| 6,532,368 B1 * | 3/2003 | Hild et al. | 455/515 |
| 6,662,230 B1 | 12/2003 | Eichstaedt et al. | |
| 6,664,978 B1 * | 12/2003 | Kekic et al. | 715/733 |
| 6,684,252 B1 * | 1/2004 | Chow | 709/228 |
| 6,687,878 B1 | 2/2004 | Eintracht et al. | |
| 6,925,484 B2 * | 8/2005 | Fujimori et al. | 709/202 |
| 6,941,341 B2 * | 9/2005 | Logston et al. | 709/203 |
| 7,079,546 B2 * | 7/2006 | Krishnan | 370/412 |
| 7,130,883 B2 * | 10/2006 | Zhu et al. | 709/204 |
| 7,136,062 B1 * | 11/2006 | Butler | 345/422 |
| 7,222,305 B2 * | 5/2007 | Teplov et al. | 715/751 |

(Continued)

OTHER PUBLICATIONS

Hall et al., "Corona: A Communication Service for Scalable, Reliable Group Collaboration Systems", 1996.*

(Continued)

*Primary Examiner* — O. C. Vostal
(74) *Attorney, Agent, or Firm* — Thomas Wong; Jim Ross; Mickey Minhas

(57) ABSTRACT

Client-server interaction frequency control may be provided. First, a collaborative electronic document may be loaded at a client device in a document collaboration session. The client device may then request a client-server interaction with a server hosting the collaboration session. Next, the client may receive input from the server indicating a state of the server. This input may then be used by the client device to adjust a rate at which the requested client-server interaction may occur.

21 Claims, 5 Drawing Sheets

(56) References Cited

U.S. PATENT DOCUMENTS

| | | | |
|---|---|---|---|
| 7,460,556 B2 | 12/2008 | Duggirala et al. | |
| 7,630,862 B2 | 12/2009 | Glas et al. | |
| 7,822,808 B2* | 10/2010 | Caplan et al. | 709/203 |
| 8,185,828 B2* | 5/2012 | Liu et al. | 715/753 |
| 8,271,631 B1* | 9/2012 | Horvitz et al. | 709/223 |
| 2002/0049786 A1* | 4/2002 | Bibliowicz et al. | 707/511 |
| 2002/0099777 A1* | 7/2002 | Gupta et al. | 709/206 |
| 2002/0138624 A1* | 9/2002 | Esenther | 709/227 |
| 2002/0144136 A1* | 10/2002 | Stornetta et al. | 713/200 |
| 2003/0115295 A1 | 6/2003 | Potts, Jr. et al. | |
| 2003/0158758 A1* | 8/2003 | Kanazawa et al. | 705/4 |
| 2004/0071184 A1* | 4/2004 | Naveh et al. | 374/42 |
| 2004/0181579 A1* | 9/2004 | Huck et al. | 709/205 |
| 2004/0236860 A1* | 11/2004 | Logston et al. | 709/230 |
| 2004/0250059 A1* | 12/2004 | Ramelson et al. | 713/150 |
| 2005/0002372 A1 | 1/2005 | Rune et al. | |
| 2005/0278642 A1* | 12/2005 | Chang et al. | 715/751 |
| 2005/0289224 A1 | 12/2005 | Deslippe et al. | |
| 2006/0010125 A1* | 1/2006 | Beartusk et al. | 707/4 |
| 2006/0168073 A1* | 7/2006 | Kogan et al. | 709/206 |
| 2007/0014259 A1* | 1/2007 | Fajardo et al. | 370/331 |
| 2007/0245238 A1* | 10/2007 | Fugitt et al. | 715/700 |
| 2007/0288546 A1* | 12/2007 | Rosenberg | 709/201 |
| 2008/0028083 A1* | 1/2008 | Rezvani et al. | 709/229 |
| 2008/0046828 A1* | 2/2008 | Bibliowicz et al. | 715/751 |
| 2008/0095079 A1* | 4/2008 | Barkley et al. | 370/260 |
| 2008/0114639 A1* | 5/2008 | Meek et al. | 705/10 |
| 2008/0117839 A1* | 5/2008 | Raju et al. | 370/261 |
| 2008/0122647 A1* | 5/2008 | Schulze et al. | 340/815.58 |
| 2008/0168139 A1* | 7/2008 | Junuzovic et al. | 709/205 |
| 2008/0279183 A1* | 11/2008 | Wiley et al. | 370/389 |
| 2008/0294758 A1* | 11/2008 | Xiao et al. | 709/221 |
| 2009/0043849 A1 | 2/2009 | Blackburn et al. | |
| 2009/0077641 A1* | 3/2009 | Trevallyn-Jones | 726/6 |
| 2009/0150544 A1* | 6/2009 | Tamura | 709/224 |
| 2009/0157811 A1 | 6/2009 | Bailor et al. | |
| 2009/0217175 A1* | 8/2009 | Bechtel et al. | 715/751 |
| 2009/0240628 A1* | 9/2009 | Blair et al. | 705/80 |
| 2009/0249224 A1 | 10/2009 | Davis et al. | |
| 2009/0282041 A1 | 11/2009 | Skaria et al. | |
| 2009/0287746 A1 | 11/2009 | Brown | |
| 2009/0327459 A1* | 12/2009 | Yoo et al. | 709/221 |
| 2010/0005398 A1* | 1/2010 | Pratley et al. | 715/751 |
| 2010/0036956 A1* | 2/2010 | Nishikawa | 709/226 |
| 2010/0241760 A1* | 9/2010 | Zhang et al. | 709/205 |
| 2010/0241972 A1* | 9/2010 | Spataro et al. | 715/753 |
| 2010/0256902 A1* | 10/2010 | Coch et al. | 701/208 |
| 2010/0260468 A1* | 10/2010 | Khatib et al. | 386/52 |
| 2010/0271947 A1* | 10/2010 | Abdelal et al. | 370/235 |
| 2010/0332454 A1* | 12/2010 | Prahlad et al. | 707/654 |
| 2011/0055329 A1* | 3/2011 | Abt et al. | 709/205 |
| 2011/0128889 A1* | 6/2011 | Liao et al. | 370/255 |
| 2011/0252125 A1 | 10/2011 | Tse et al. | |
| 2011/0258338 A1* | 10/2011 | Vass | 709/233 |
| 2011/0271005 A1* | 11/2011 | Bharrat et al. | 709/232 |

OTHER PUBLICATIONS

Dourish, "Using Metalevel Techniques in a Flexible Toolkit for CSCW Applications", 1998.*

Knapp et al., "Model Checking Timed UML State Machines and Collaborations", 2002.*

Dommel et al., "Efficacy of floor control protocols in distributed multimedia collaboration", 1999.*

Liu et al., "State-Centric Programming for Sensor-Actuator Network Systems", 2003.*

Azer Bestavros, Demand based Document Dissemination to Reduce Traffic and Balance Load—Published Date: Oct. 1995 http://citeseerx.ist.psu.edu/viewdoc/downlaod?doi=10.1.1.121.1657&rep=rep1&type=pdf.

Jeremy Kerr, Using Dynamic Feedback to Optimise Load Balancing Decisions—Retrieved Date: Apr. 12, 2010 http://mirror.linux.org.au/linux.conf.au/2003/papers/Jeremy_Kerr/Jeremy_Kerr.pdf.

Copending U.S. Appl. No. 12/757,062, filed Apr. 9, 2010 entitled "Dynamic Syncing".

AbiWord, Published Date: Jan. 11, 2010, 2 pgs., http://en.wikipedia.org/wiki/Abiword.

Neil Fraser, "Differential Synchronization," Published Date: Sep. 18, 2009, 8 pgs., http://neil.fraser.name/writing/sync/eng047-fraser.pdf.

Qinyi Wu et al., "Consistency in Real-Time Collaborative Editing Systems Based on Partial Persistent Sequences," Published Date: Jul. 2009, 10 pgs., http://smartech.gatech.edu/bitstream/1853/31372/1/git-ceres-09-07.pdf.

"SynchroEdit," Published Date: Aug. 22, 2008, 6 pgs., http://www.synchroedit.com/.

"Colligo Contributor V2.2—A Better Online Experience," Published Date: Oct. 2007, 7 pgs., http://www.colligo.com/Newsletter/colligo_newsletter_Oct07.html.

Prasun Dewan et al., "An Editing-Based Characterization of the Design Space of Collaborative Applications," Published Date: 1994, pp. 1-19, http://citeseerx.ist.psu.edu/viewdoc/downlad?doi=10.1.1.47.6123&rep=rep1&type=pdf.

U.S. Office Action dated Dec. 23, 2011 cited in U.S. Appl. No. 12/757,062, 22 pgs.

U.S. Final Office Action dated Sep. 10, 2012 cited in U.S. Appl. No. 12/757,062, 30 pgs.

* cited by examiner

CLIENT-SERVER INTERACTION FREQUENCY CONTROL

BACKGROUND

With conventional client-server applications, it is difficult to maintain good server health because of increased server load. The increased server load is caused by many client applications all frequently communicating with the server. Each client application may often want to communicate with the server as frequently as possible without regard for the impact such frequent communication may have on the server. Consequently, the server may be overwhelmed, potentially resulting in poor client-server interaction.

SUMMARY

This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

Client-server interaction frequency control may be provided. First, a collaborative electronic document may be loaded at a client device in a document collaboration session. The client device may then request a client-server interaction with a server hosting the collaboration session. Next, the client may receive input from the server indicating a state of the server. This input may then be used by the client device to adjust a rate at which the requested client-server interaction may occur.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1:
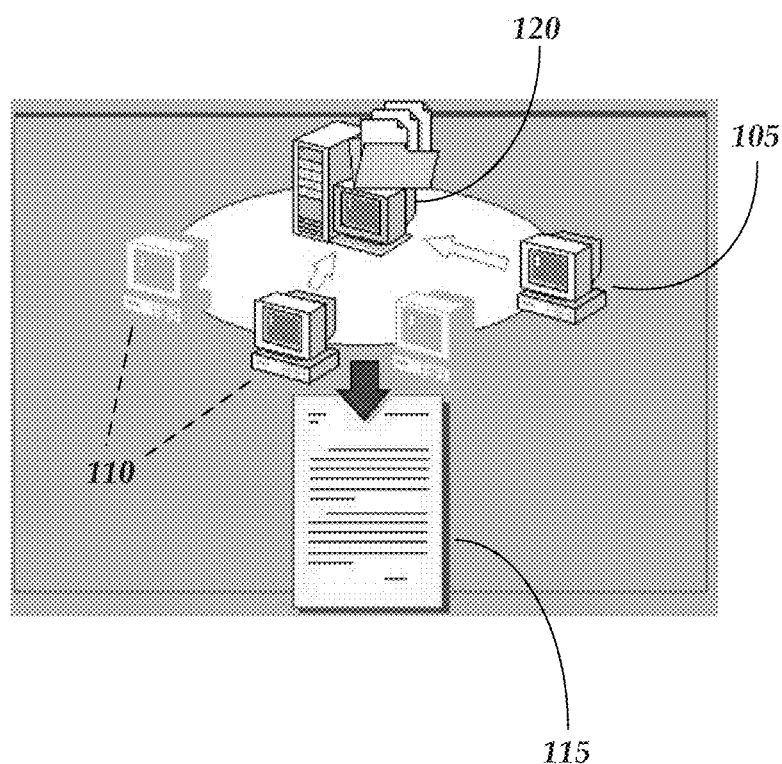
FIG. 1 is a block diagram of an operating environment.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

FIG. 1. illustrates an operating environment 100 for providing client-server interaction frequency control. Consistent with embodiments of the invention, client 105 may be in communication with server 120. Client 105 and server 120 may interact so as to establish an operating environment for creating and editing a collaborative electronic document 115. Similarly, additional clients 110 may be in communication with server 120 and collaborate on collaborative electronic document 115 in parallel with client 105. Accordingly, client 105 may send, for example, requests associated with operating on collaborative electronic document 115 to server 120.

As will be described in greater detail below, these requests may be limited in frequency based on various variables associated with document, client, and server status. Though client 105 may be referenced without also referencing clients 110, according to various embodiments of the invention, any operation or function that may be performed by or available to client 105 may also be performed by and available to clients 110.

Consistent with embodiments of the invention, a client-server request may correspond to any client-to-server interaction in which client 105 requests to receive information from or provide information to server 120. One such client-server interaction may be a request made by client 105 to, for example, receive or provide information associated with collaborative electronic document 115. Collaborative electronic document 115 may be any electronic document that may be, for example, created, edited, and viewed by client 105 and clients 110 via server 120. Furthermore, consistent with embodiments of the invention, collaborative electronic document 115 is not limited to being a document and may comprise any type file.

Supporting information may be needed by both client 105 and server 120 to ensure that collaborative electronic document 115 is in a proper collaborative state for client-editing. Provision of this information may be facilitated through, for example, metadata uploading, update checking and downloading, and collaboration status checking.

Consistent with embodiments of the invention, metadata uploading, update checking and downloading, and collaboration status checking may each comprise client-server interactions used to support document collaboration. These client-server interactions may comprise a communication from client 105 to server 120 for receiving or providing the supporting information employed in operating on collaborative electronic document 115. According to various embodiments, such client-server interactions may be known as client-server 'requests', though these client-server interactions are not limited to requests made from client 105 to server 120.

Embodiments of the invention may comprise several client-server request types. A first client-server request type may comprise a 'Metadata Upload' interaction. This first client-server interaction may provide, for example, server 120 with information about which client is editing collaborative electronic document 115 and at which point within collaborative electronic document 115 the editing is taking place. This editing information may be uploaded to server 120 whenever a user starts editing collaborative electronic document 115.

A second client-server request type consistent with embodiments of the invention may comprise an 'Update Check and Download' interaction. This second client-server interaction may be employed in, for example, determining if any new collaborative data is available on server 120 for collaborative electronic document 115. The collaborative data may be, for example, but not limited to, collaborative electronic document 115 metadata provided by to server 120 through the first client-server request type from any of the clients collaborating on document 115. In turn, if it is determined that the new collaborative data is available on server 120, the new collaborative data may be downloaded by the requesting client and used to update a collaborative document state at the requesting client.

A third client-server request type consistent with embodiments of the invention may comprise a "Get Collaboration Status" interaction. This third client-server interaction may be employed in, for example, determining an amount of clients collaborating on collaborative electronic document 115. In embodiments of the invention, this client-server interaction may occur in conjunction with the 'Update Check and Download' client-server interaction.

Consistent with embodiments of the invention, the aforementioned client-server request types and interactions are only a few of several client-server communications that may be employed in collaborative document provision. Embodiments of the invention may employ various other client-server interactions for providing document collaboration.

Client-server requests consistent with embodiments of the invention may be 'on-demand' requests or repeated requests scheduled via, for example, a request sync scheduler. An on-demand request may comprise a client-server interaction initiated by client 105 in response to an action on client 105. The action may comprise, for example, an edit to collaborative electronic document 115 or any other action pertaining to collaborative electronic document 115 or a state thereof. A repeatable request may comprise a scheduled client-server interaction set to occur repeatedly on a regular cycle.

In accordance to embodiments of the invention, both on-demand and repeated request frequency may be dynamically controlled based on various control variables. These variables may be provided by either client 105 or sever 120 and may be employed in determining a frequency of client-server interaction. These variables may provide information regarding:
   a. Server Health—a health status of server 120 may indicate, for example, a load bearing on server 120. The health status of server 120 may be represented by a server health integer value, ranging, for example, from '0-10', provided to gauge the health status of server 120. The server health integer value may be calculated server-side based on health metrics of server 120, with a value of '0' indicating good server health and a value of '10' indicating poor server health.
   Consistent with embodiments of the invention, stronger server health indications may allow for more frequent client-server interactions, while weaker server health indications may correspond to limiting client-server interactions to occur for less frequently.
   b. Session State—a number of clients communicating with server 120 may be used in determining the session state. In various embodiments, co-authoring metadata provided by connected clients may be used to determine the number of clients currently co-authoring collaborative electronic document 115 in a given collaboration session. Consistent with embodiments of the invention, client-server interaction frequency may be dynamically adjusted based on a state of the collaborative session.
   c. Client State—a state of a client communicating with server 120 may also be employed in determining client-server interaction frequency. For example, by reducing the client-server interaction frequency for inactive clients, server resources may be made available to serve active clients or other server processes.
   Consistent with embodiments of the invention, the client state may be determined based upon, for example, document activity and client activity. In this way, if it is determined that collaborative electronic document 115 is running in a 'background' state on a corresponding client machine, then the client-server interaction frequency may be decreased to a 'background' frequency. Furthermore, if it is determined that the client machine is running in an 'idle' state, the client-server interaction frequency may be further decreased to an 'idle' frequency.
   In various embodiments, after having determined that collaborative electronic document 115 is running in the 'background' state on the client machine or that the client machine is running an 'idle' state, a predetermined time period must elapse before changing the client-server interaction frequency. This time period may be set to ensure that collaborative electronic document 115 or the client machine have indeed changed in their activity state prior to adjusting client-server interaction.

Consistent with embodiments of the invention, the aforementioned control variables are only a few of several control variables that may be employed in collaborative document provision. Embodiments of the invention may employ various other control variables for providing client-interaction frequency adjustment.

Dynamic client-server interaction frequency control may also be known as gating. Consistent with embodiments of the invention, on-demand client requests may be gated based on the indications provided by control variables. For example, if client 105 is requesting to upload data to sever 120 every second while at least one control variable indicates that client-server communication should not occur more frequently than every 30 seconds, then client 105 may be denied sending such requests to server 120 until 30 seconds have passed from the point of the initial client request. Should on-demand requests continue to be made during the 30 second period of request denial, embodiments of the invention may buffer the on-demand requests into a client-side 'batch' of requests and execute the client-server interactions associated with the 'batch' once the 30 second period has passed. In this way, server 120 will not be continuously flooded with client-server requests and receive the requests in batches.

Similarly, for repeatable requests, control variables may be used to calculate and modify request cycle frequency. In various embodiments of the invention, cycle frequency modification may occur by modifying the request cycle frequency set by, for example, the request sync scheduler on client 105, thereby allowing for the request cycle frequency to be set and modified. For example, if client 105 is scheduled to check for updates every 30 seconds while a server health status variable begins to indicate stronger server health, the request cycle frequency may be increased so as to cause the check for updates to occur every 10 seconds. Client-server request gating will be described in greater detail with reference to FIG. 2 and FIG. 3 below.

Figure 2:
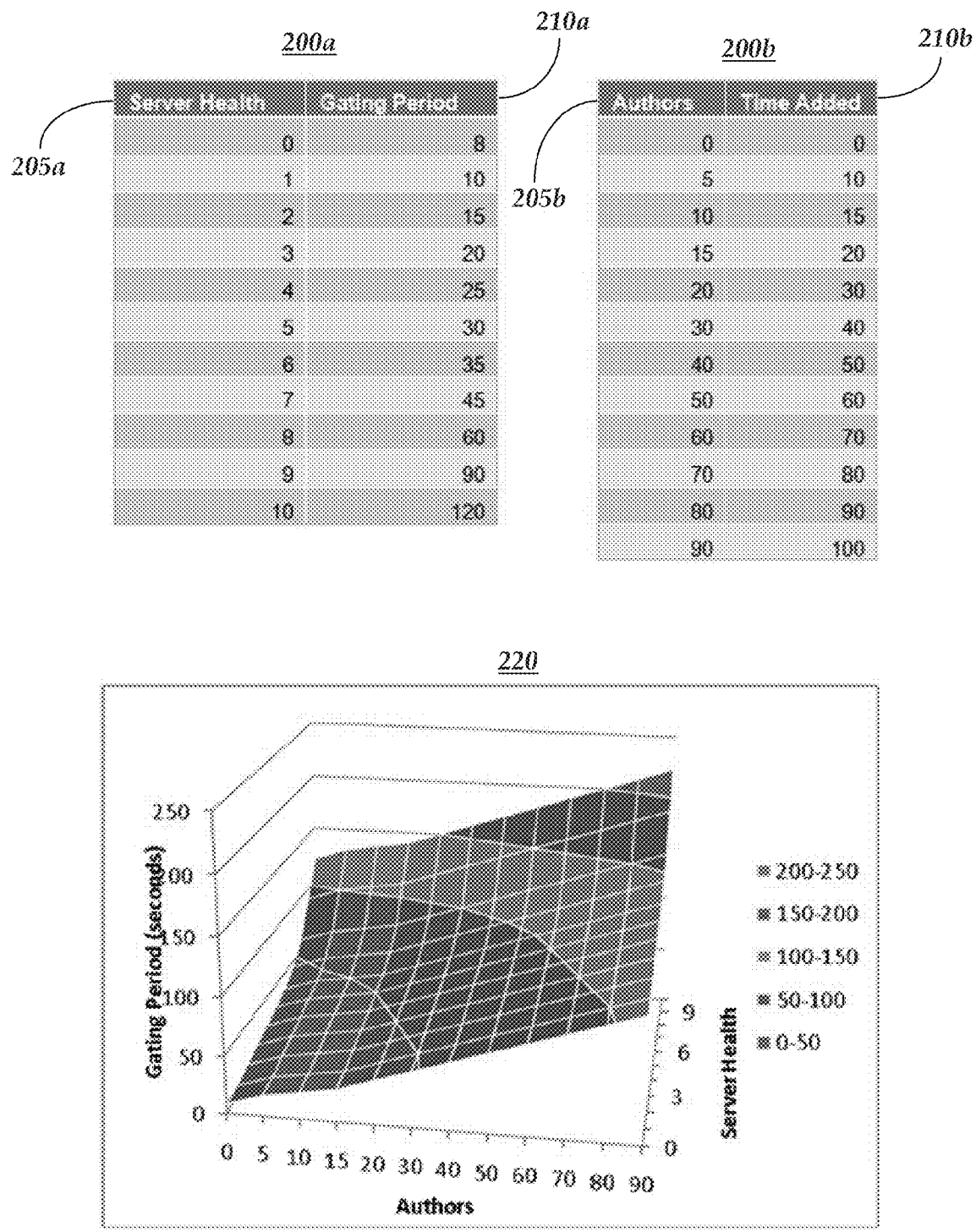
FIG. 2 shows tables and a diagram illustrating client-server request gating.

FIG. 2 illustrates tables and a diagram showing metadata upload gating periods as they relate to control variables. As mentioned above, a metadata upload client-server interaction may be a request by client 105 to upload metadata associated with collaborative electronic document 115 and client 105 to server 120. Consistent with embodiments of the invention, the metadata upload request may be based on, for example, a server health status variable and a session state variable. Diagram 220 is a graph illustrating the metadata upload gating period as it relates to both the server health status variable and the session state variable.

The server health status and its corresponding effect on the metadata upload gating period may be illustrated by Table 200a. Table 200a comprises Column 205a representing a server health status integer and Column 210a representing the metadata upload gating period in seconds. As represented by Table 200a, when the server health status integer increases, indicating weaker server health, the metadata upload period may also increase. In this way, metadata upload requests sent from clients 105 to servers 120 may decrease in frequency when server health status variable indicates that server 120 is bearing a greater load.

Table 200b illustrates the session state variable and its corresponding effect on the metadata upload gating period. Table 200b comprises Column 205b representing a number of clients co-authoring collaborative electronic document 115 and Column 210b representing the metadata upload gating period in seconds. As previously mentioned, the session state variable may indicate a number of clients collaborating on collaborative electronic document 115 over server 120. As represented by Table 200b, when the number of clients co-authoring collaborative electronic document 115 increases, the metadata upload gating period may also increase. In this way, metadata upload requests sent from client 105 to servers 120 may decrease in frequency in response to an increasing amount of clients co-authoring collaborative electronic document 115. The decrease in frequency may account for the increased client-server interactions server 120 would need to handle for each additional client in communication with server 120.

Figure 3:
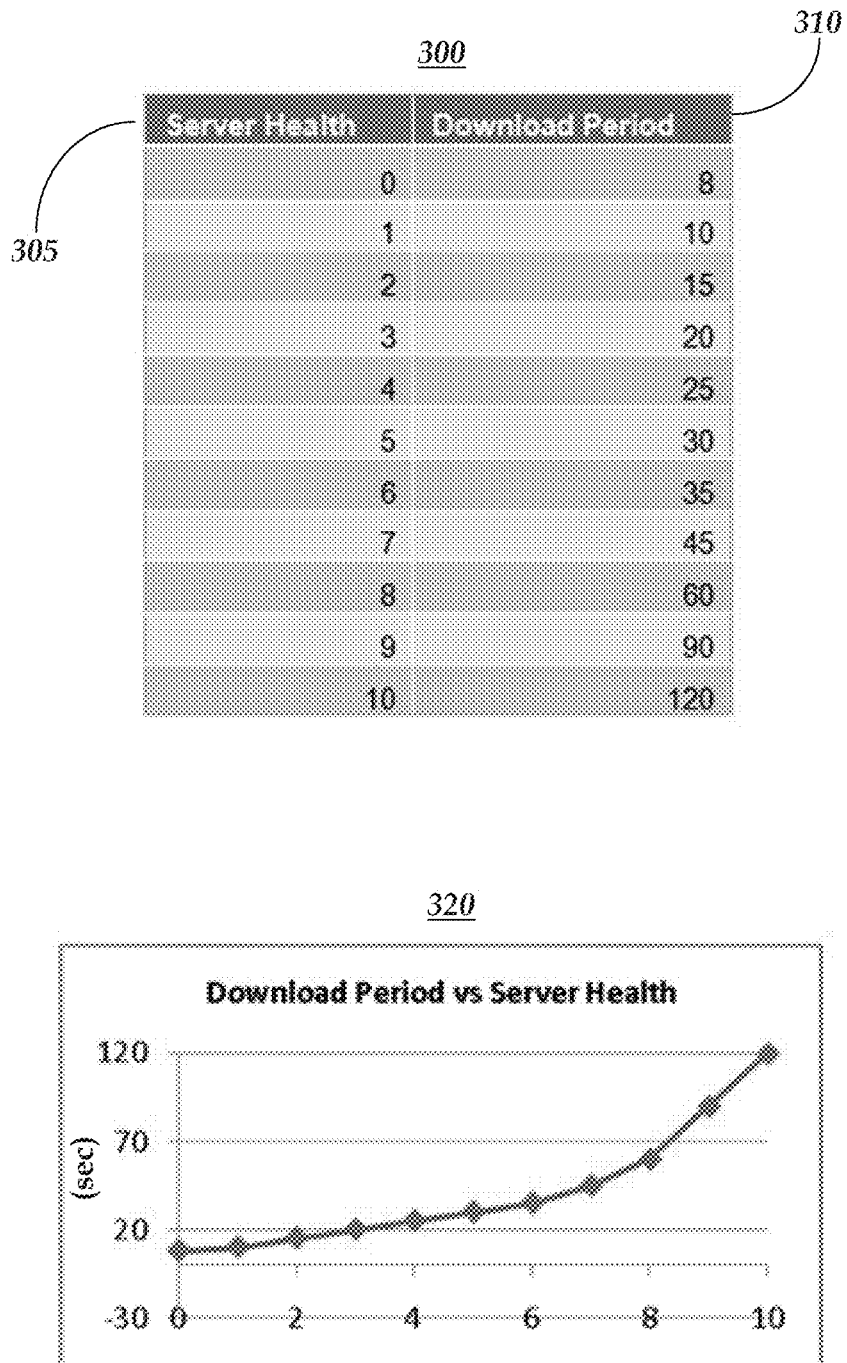
FIG. 3 shows another table and another diagram illustrating client-server request gating.

FIG. 3 illustrates the server health status and its corresponding effect on update check, download, and collaboration session status request gating periods. Table 300 comprises Column 305 representing the server health status integer and Column 310 representing the gating periods, in seconds, for download, and collaboration session status requests. As represented by Table 300, these gating periods increase as the server health status weakens. In this way, update check, download, and collaboration session status requests sent from client 105 to server 120 may decrease in frequency when server health status variable indicates that server 120 is bearing a greater load. Diagram 320 is a graph illustrating these gating periods as they relate to the server health status variable.

Consistent with embodiments of the invention, update check, download, and collaboration session status request gating periods may also be adjusted based on client state variables. As discussed above, the client status variables may indicate whether collaborative electronic document 115 is running in a 'background' state on client 105 and whether client 105 is at an 'idle' state. In various embodiments, if the client state indicates that collaborative electronic document 115 is running the 'background' state, the update check, download, and collaboration session status request gating periods may be decreased. Similarly, if the client state indicates that client 105 is in the 'idle' state, the update check, download, and collaboration session status request gating periods may be again decreased.

The aforementioned description refers to gating as a control of client-server interaction frequency. Accordingly, the term 'gating period' as used herein may apply to both a period of time in between repeatable requests and a period of time for which on-demand requests are withheld from server communication.

Figure 4:
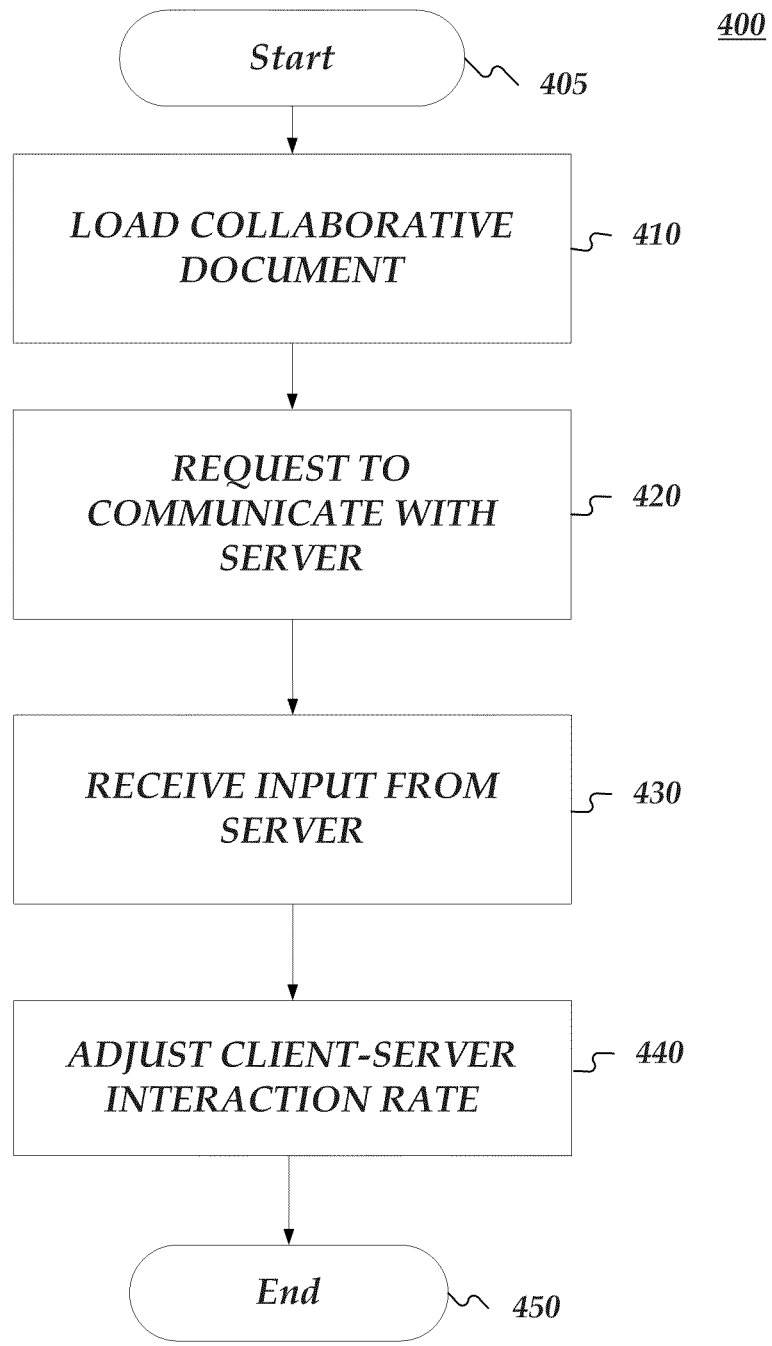
FIG. 4 is a flow chart of a method for controlling client-server interaction frequency.

FIG. 4 is a flow chart setting forth the general stages involved in a method 400 consistent with an embodiment of the invention for providing client-server interaction frequency control. Method 400 may be implemented using a computing device 500 as described in more detail below with respect to FIG. 5. Client 105, as described above, may be practiced using computing device 500. Ways to implement the stages of method 400 will be described in greater detail below.

Method 400 may begin at starting block 405 and proceed to stage 410 where computing device 500 may load a collaborative electronic document 115. Collaborative electronic document 115 may be hosted on server 120 in a document collaboration session comprising clients 110.

From stage 410, where computing device 500 loads collaborative electronic document 115, method 400 may advance to stage 420 where computing device 500 may request to communicate with server 120. For example, computing device 500 may request to communicate with server 120 in order to update a state of collaborative electronic document 115. As detailed with reference to FIG. 1 above, updating the collaborative document state may comprise either sending information to server 120 or requesting information from server 120. Moreover, these communications with server 120 may occur at an on-demand basis or at a scheduled reoccurring rate.

Once computing device 500 communicates with server 120 stage 420, method 400 may continue to stage 430 where computing device 500 may receive input from server 120. The received input may comprise, for example, variables for adjusting client-server interaction frequency, such as server health status information and collaborative session status information. The received input may be analyzed to determine an appropriate client-server interaction frequency.

After computing device 500 receives the input from server 120 in stage 430, method 400 may proceed to stage 440 where computing device 500 may adjust a client-server interaction rate. For example, client-server interaction rate adjustment may comprise client-interaction frequency adjustment for repeatable requests and gating period adjustment for on-demand requests.

As mentioned above, the gating period may be a period of time for which the client-server interactions may not occur. This period may be determined by, for example, analyzing the received input from server 120, as well as local variables reflecting a state of collaborative electronic document 115 and an activity state of computing device 500. In addition, the nature of the server communication, such as the request type discussed above, may also be an analyzed factor in determining the gating period. For repeatable, or scheduled, requests, the gating period may be a period of time in between scheduled client-server interactions. Thus, changes to the gating period may result in changes to a frequency of the repeatable requests. For on-demand requests, the gating period may be a period of time an on-demand request is withheld or buffered as further detailed below.

Consistent with embodiments of the invention, once the gating period is determined, the server communication request may be withheld for a duration of the determined gating period. During this gating period, computing device 500 may buffer the server communication request, as well as any subsequent request made during the gating period, into 'batches'. When the gating period expires, the computing device 500 may perform the client-server interactions buffered into the 'batches' during the gating period. Once computing device 500 adjusts the rate of the requested server communication in stage 440, method 400 may then end at stage 450.

An embodiment consistent with the invention may comprise a system for controlling client-server interaction frequency. The system may comprise a memory storage and a processing unit coupled to the memory storage. The processing unit may be operative to loading a collaborative electronic document in a document collaboration session, request to communicate with a server hosting the collaboration session through a client-server interaction, receive input from the server for determining a gating period, and adjust a rate of the requested client-server interaction.

Another embodiment consistent with the invention may comprise a system for providing controlling client-server interaction frequency. The system may comprise a memory storage and a processing unit coupled to the memory storage. The processing unit may be operative to load a collaborative electronic document on a client device, request to interact with a server hosting a document collaboration session associated with the collaborative electronic document, receive input from the server comprising at least one of the following: a state of the server and a state of the document collaboration session, determine a gating period based on at least one of the following: the received input from the server, a state of the client device, and a state of the collaborative electronic document loaded on the client device, and gate the requested server interaction for a duration of the gating period.

Yet another embodiment consistent with the invention may comprise a system for controlling client-server interaction frequency. The system may comprise a memory storage and a processing unit coupled to the memory storage. The processing unit may be operative to load a collaborative electronic document associated with a document collaboration session, schedule a reoccurring server interaction rate associated with updating a state of the collaborative electronic document, request to interact with a server at the scheduled rate, analyze at least one variable employed in adjusting the scheduled rate, adjust the scheduled reoccurring server interaction rate, and request to interact with the server at the adjusted server interaction rate.

Figure 5:
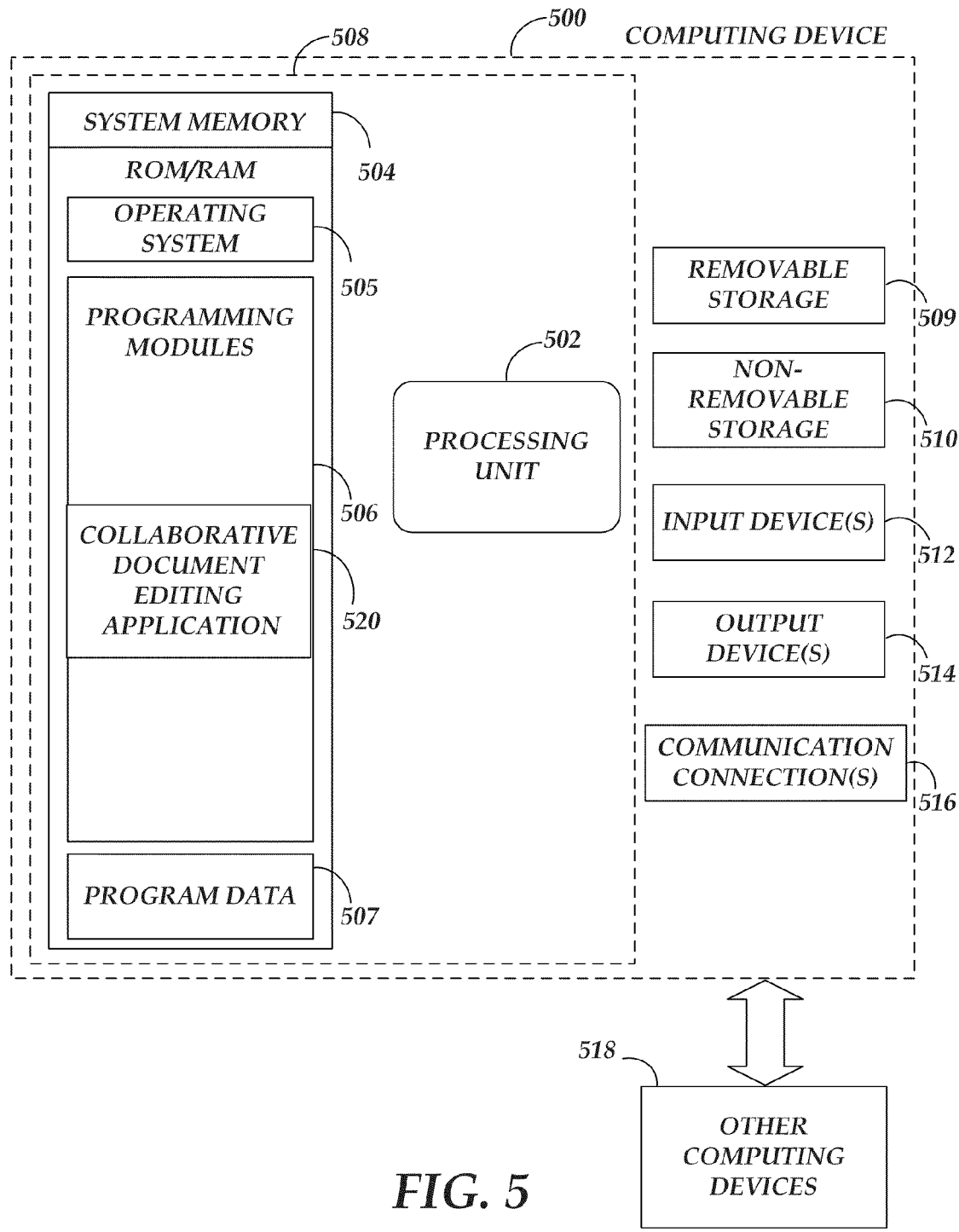
FIG. 5 is a block diagram of a system including a computing device.

FIG. 5 is a block diagram of a system including computing device 500. Consistent with an embodiment of the invention, the aforementioned memory storage and processing unit may be implemented in a computing device, such as computing device 500 of FIG. 5. Any suitable combination of hardware, software, or firmware may be used to implement the memory storage and processing unit. For example, the memory storage and processing unit may be implemented with computing device 500 or any of other computing devices 518, in combination with computing device 500. The aforementioned system, device, and processors are examples and other systems, devices, and processors may comprise the aforementioned memory storage and processing unit, consistent with embodiments of the invention. Furthermore, computing device 500 may comprise an operating environment for client 105 as described above. Client 105 may operate in other environments and is not limited to computing device 500.

With reference to FIG. 5, a system consistent with an embodiment of the invention may include a computing device, such as computing device 500. In a basic configuration, computing device 500 may include at least one processing unit 502 and a system memory 504. Depending on the configuration and type of computing device, system memory 504 may comprise, but is not limited to, volatile (e.g. random access memory (RAM)), non-volatile (e.g. read-only memory (ROM)), flash memory, or any combination. System memory 504 may include operating system 505, one or more programming modules 506, and may include a program data 507. Operating system 505, for example, may be suitable for controlling computing device 500's operation. In one embodiment, programming modules 506 may include a collaborative document editing application 520. Furthermore, embodiments of the invention may be practiced in conjunction with a graphics library, other operating systems, or any other application program and is not limited to any particular application or system. This basic configuration is illustrated in FIG. 5 by those components within a dashed line 508.

Computing device 500 may have additional features or functionality. For example, computing device 500 may also include additional data storage devices (removable and/or non-removable) such as, for example, magnetic disks, optical disks, or tape. Such additional storage is illustrated in FIG. 5 by a removable storage 509 and a non-removable storage 510. Computer storage media may include volatile and nonvolatile, removable and non-removable media implemented in any method or technology for storage of information, such as computer readable instructions, data structures, program modules, or other data. System memory 504, removable storage 509, and non-removable storage 510 are all computer storage media examples (i.e., memory storage). Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 500. Any such computer storage media may be part of device 500. Computing device 500 may also have input device(s) 512 such as a keyboard, a mouse, a pen, a sound input device, a touch input device, etc. Output device(s) 514 such as a display, speakers, a printer, etc. may also be included. The aforementioned devices are examples and others may be used.

Computing device 500 may also contain a communication connection 516 that may allow device 500 to communicate with other computing devices 518, such as over a network in a distributed computing environment, for example, an intranet or the Internet. Communication connection 516 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 504, including operating system 505. While executing on processing unit 502, programming modules 506 (e.g. collaborative document editing application 520) may perform processes including, for example, one or more method 400's stages as described above. The aforementioned process is an example, and processing unit 502 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for controlling client-server interaction frequency, the method comprising:
    loading a collaborative electronic document in a document collaboration session;
    requesting to communicate with a server hosting the document collaboration session, wherein requesting to communicate with the server hosting the document collaboration session comprises requesting to make a client-server interaction for one of: receiving information associated with document collaboration and providing the information associated with document collaboration;
    receiving input from the server comprising a state of the server;
    adjusting a rate of client-server interaction based on the received input from the server, wherein adjusting the rate of the client-server interaction comprises adjusting the rate of client-server interaction at least based on a health of the server as indicated by the state of the server;
    ensuring that the collaborative electronic document is in a proper collaborative state for client-editing by scheduling repeatable requests and by changing a gating period in between client-server interactions to change a frequency of the repeatable requests; and
    repeating a repeatable request to interact with the server at the adjusted rate of client-server interaction after the gating period expires.

2. The method of claim 1, wherein adjusting the rate of client-server interaction based on the received input from the server comprises:
  determining the gating period based on the received input from the server; and
  gating the requested client-server interaction for a duration of the gating period.

3. The method of claim 2, wherein gating the requested client-server interaction comprises buffering the requested client-server interaction.

4. The method of claim 3, wherein gating the requested client-server interaction with server further comprises buffering all subsequently requested client-server interactions made during the gating period.

5. The method of claim 2, further comprising performing the requested client-server interaction upon gating period expiration.

6. The method of claim 4, further comprising performing, upon gating period expiration, all of the requested client-server interactions buffered during the gating period.

7. The method of claim 1, wherein adjusting the rate of client-server interaction based on the received input from the server comprises adjusting the rate of client-server interaction based on a request-type of the requested client-server interaction.

8. The method of claim 1, wherein requesting to communicate with the server further comprises requesting to communicate with the server at a scheduled frequency.

9. The method of claim 8, wherein adjusting the rate of client-server interaction based on the received input from the server comprises adjusting the scheduled frequency.

10. The method of claim 1, wherein adjusting the rate of client-server interaction based on the received input from the server further comprises adjusting the rate of client-server interaction based on the received input from the server based on at least one of the following:
  an activity state of the collaborative electronic document running on a client computer, and
  a state of a client computer loading the collaborative electronic document.

11. The system of claim 1, wherein the processing unit configured to adjust the gating period in between client-server interactions to change a frequency of repeatable requests comprises the processing unit being configured to increase the gating period when the number of clients collaborating on the collaborative electronic document increases and to decrease the gating period when the number of clients collaborating on the collaborative electronic document decreases.

12. A computer-readable storage device having a set of instructions which when executed performs a method for controlling client-server interaction frequency, the method executed by the set of instructions comprising:
  loading a collaborative electronic document on a client device;
  requesting to interact with a server hosting a document collaboration session associated with the collaborative electronic document;
  receiving input from the server comprising a state of the server, the state of the server indicating a health status of the server that is based on server-side calculations of health metrics of the server;
  determining a gating period based on at least the received input from the server;
  gating the requested server interaction for a duration of the gating period;
  ensuring that the collaborative electronic document is in a proper collaborative state for client-editing by scheduling repeatable requests and by changing a gating period in between client-server interactions to change a frequency of the repeatable requests; and
  repeating a repeatable request to interact with the server at the adjusted rate of client-server interaction after the gating period expires.

13. The computer-readable storage device of claim 12, wherein determining the gating period comprises determining the gating period further based on a request-type of the requested server interaction.

14. The computer-readable storage device of claim 12, wherein gating the requested server interaction comprises buffering the requested server interaction at the client device.

15. The computer-readable storage device of claim 14, further comprising performing the requested server interaction upon gating period expiration.

16. The computer-readable storage device of claim 14, further comprising gating all subsequent server interaction requests made during the gating period.

17. The computer-readable storage device of claim 16, wherein gating all subsequent server interaction requests comprises buffering the subsequent requested server interactions made during the gating period.

18. The computer-readable storage device of claim 16, further comprising performing all of the gated server interactions upon gating period expiration.

19. A system for controlling client-server interaction frequency, the system comprising:
  a memory storage; and
  a processing unit coupled to the memory storage, wherein the processing unit is configured to:
    load a collaborative electronic document associated with a document collaboration session,
    ensuring that the collaborative electronic document is in a proper collaborative state for client-editing by scheduling client-server interactions associated with updating a state of the collaborative electronic document to occur repeatedly,
    analyze at least one variable employed in adjusting the scheduled frequency,
    adjust the gating period in between client-server interactions to change a frequency of repeatable requests, and
    repeat a repeatable request to interact with the server at the adjusted rate of client-server interaction after the gating period expires.

20. The system of claim 19, wherein the at least one variable is received from the server and provides an indication of server health.

21. The system of claim 20, wherein the processing unit configured to adjust the gating period in between client-server interactions to change a frequency of repeatable requests comprises the processing unit being configured to adjust the scheduled reoccurring server interaction to occur less frequently when the received indication of server health indicates poor server health.

* * * * *